Dec. 13, 1960   M. C. PAVLIC   2,963,750
ELECTRICALLY CONDUCTIVE EXTENSIBLE HOSE
Original Filed Dec. 21, 1956   4 Sheets-Sheet 1

Dec. 13, 1960  M. C. PAVLIC  2,963,750
ELECTRICALLY CONDUCTIVE EXTENSIBLE HOSE
Original Filed Dec. 21, 1956

Dec. 13, 1960 M. C. PAVLIC 2,963,750
ELECTRICALLY CONDUCTIVE EXTENSIBLE HOSE
Original Filed Dec. 21, 1956 4 Sheets-Sheet 4

United States Patent Office 2,963,750
Patented Dec. 13, 1960

2,963,750

ELECTRICALLY CONDUCTIVE EXTENSIBLE HOSE

Mary C. Pavlic, North Canton, Ohio, assignor to The Hoover Company, North Canton, Ohio, a corporation of Ohio Original application Dec. 21, 1956, Ser. No. 629,873. Divided and this application Nov. 24, 1958, Ser. No. 776,135

10 Claims. (Cl. 18—59)

This application is a division of my copending application, Serial No. 629,873, filed December 21, 1956. This application claims the method of making the electrically conductive extensible hose disclosed and claimed in the parent application above identified.

The present invention relates to a flexible and extensible hose and more particularly to an electrically conductive flexible and extensible hose for use with suction cleaners and to the method of making the same.

The present invention is an improvement over the hose of the United States patent to Jack E. Duff, 2,739,616, in that, it embodies means for conducting electricity along the length of the hose so that a suction cleaner may be controlled from the end of the hose or to provide electric current at the end of the hose for operating an electrically actuated device at the hose end.

The current flowing through the hose may be from a standard 110 volt circuit but preferably according to the present invention the voltage is stepped down by a suitable transformer-relay so that the problem of insulation is minimized and the conductivity of the conductors may be reduced.

The Duff hose is extensible lengthwise and is ultra-flexible. While broadly, electrically conductive hose are old, in prior constructions the association of electric conductors with the hose did not present much of a problem, since in the prior art, the hose are not extensible and thus the problem of making the conductor extensible to the same extent as the hose was not present.

According to the present invention the conductors are so associated with Duff type hose as to be extensible to the same extent as is the hose.

The Duff hose includes a high strength reinforcing coil, coiled into a cylindrical spiral coil embraced by a thin tube of an elastomeric thermoplastic material with the turns of the coil embraced within an inwardly facing spiral fold in the tube wall and with an outwardly facing spiral fold in the tube wall between the coil turns and inwardly thereof whereby the hose may be extended by unfolding the material of the tube wall forming the outwardly facing spiral fold.

In the Duff hose the coil is prestressed so that its turns will move into substantial contact with each other when free to do so. That is not absolutely essential but the coil should be originally so stressed that the coils will move toward each other to some extent when the hose is extended and released and so that the hose is readily extensible.

If the teaching of the prior art were to be followed it would be impossible to associate electric conductors with the Duff hose and still retain its extensibility.

According to one aspect of the present invention the coil spring of a hose of the Duff type is used as one of the conductors and a second conductor is in the form of a thin strip of conductive material so associated with the tube wall on the outside of the coil turns that it follows the longitudinal contour of the folds including the loop portions so as to be extensible to the same extent as the tube wall, thus leaving the extensibility of the hose unimpaired.

According to another aspect of the present invention a pair of thin strips of conductive material are so associated with the tube wall of the hose of the Duff type that both follow the longitudinal contour of the folds in the tube wall including the loop portions so that both conductors will be extensible to the same extent as the tube wall.

In each modification of the present invention the strip or strips may be embedded in the tube wall itself or bonded to the exterior thereof. In the latter case the conductive material is preferably sheathed within a thin sheath of the same material as the tube so that it may be readily bonded to the outside of the tube wall.

According to the method of the present invention the tube wall is extruded about the coil turns while the coil is in a stretched condition and a thin strip of conductive material is fed through the extruder at the same rate of speed as that of the stretched spring and a suction is drawn on the interior of the tube and extruding die so as to draw both the tube wall and the strip of conductive material inwardly between the turns of the stretched coil. The tube wall is then cooled while in that condition. The stretched spring is then released and the turns of the coil will move toward each other to form the folds and loop portions which are readily unfolded when the finished hose is stretched.

In one modification the conductive material is fed through the extruding die in such a manner as to become embedded in the tube wall.

In another modification, the conductive material is sheathed within a thin sheath of insulating material the same as that of the tube wall and is fed through the extruding die in such a manner as to lie on top of the tube wall as it is extruded. In this modification the sheath of the conductive material is preferably preheated or cement applied thereto so that the insulated conductive strip becomes bonded to the tube wall as it is extruded over the coil.

In another modification the conductive material is led through the extruding die so as to lie between the tube wall and the coil turns. The hose, per se, made according to this modification is not a part of the present invention but is disclosed and claimed in a copending United States application by George F. Carabet, Serial No. 629,874, filed December 21, 1956.

Other objects and advantages of the present invention will become apparent as the description proceeds when taken in connection with the accompanying drawings in which.

Figure 1:
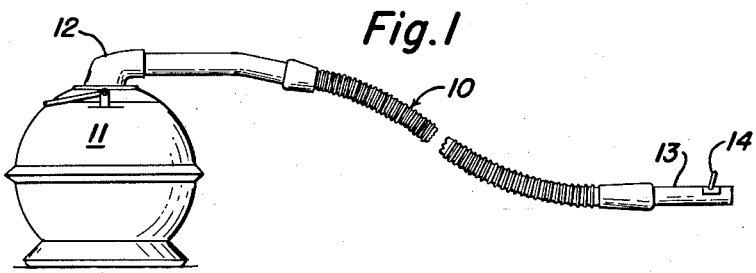
Figure 1 is a schematic view of a suction cleaner with the hose of the present invention applied and showing one adaptation of the hose of the present invention.

Fig. 1 of the drawings shows the hose of the present invention applied to a suction cleaner for controlling the operation thereof from the end of the hose and is merely one adaptation of the invention.

In Fig. 1 the hose 10 is connected to the cleaner 11 by means of a swivel connection 12 which discharges into a filter bag within the cleaner 11 in a manner well known in the art. A fitting 13 is suitably attached to the free end of the hose 10 and is adapted to be attached to any suitable cleaning tool.

As will presently appear the hose 10 is electrically conductive and a manually actuated switch 14 is electrically connected to the conductor forming a part of the hose 10 and is mounted on the fitting 13 for ready access by the operator. The other end of the conductors of the hose 10 may be connected to any suitable transformer-relay mounted within the cleaner 11 and electrically connected to the motor thereof. The arrangement is such that by actuating the switch 14 to one position or another the motor of the cleaner may be energized or de-energized, forming an arrangement by which the cleaner 11 may be controlled from the end of the hose 10.

In the arrangement just described the transformer-relay may have its primary coil connected to a standard 110 volt circuit and its secondary connected to the conductors of hose 10 so as to reduce the voltage therein to any suitable value and thus reduce the insulation requirements of the conductors in the hose 10.

The arrangement of Fig. 1 may also be used to control the energization of any suitable electrically actuated device attached to the fitting 13. In that case, at the inner end of the hose 10, the conductors of the hose would be connected to a switch for controlling the motor of the cleaner 11. The switch 14 would then be electrically connected to the electrically actuated device so as to be capable of energizing and de-energizing the same. In the latter case, the conductors of the hose 10 should be capable of carrying a full voltage from a standard 110 volt circuit.

Figure 2:
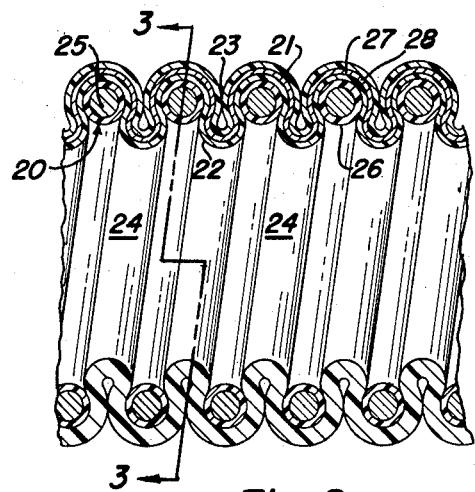
Figure 2 is a longitudinal sectional view of a section of one modification of the hose of the present invention.

The hose 10 of Fig. 2 comprises a cylindrically coiled spiral reinforcing element or coil 20 and a thin tube 21 of an elastomeric thermoplastic such as polyvinyl chloride. The tube 21 is formed with inwardly and outwardly facing spiral folds 22 and 23 respectively. The turns of the coil 20 are embraced by the inwardly facing fold 22 while the outwardly facing spiral fold 23 lies between the turns of coil 20 and includes loop portions 24 of slack material inwardly of the turns of coil 20 which are adapted to unfold when the hose is extended as will be more fully explained hereinafter.

The tube 21 may be made of polyvinyl chloride elastomer having a tensile strength of 2,000 pounds per square inch at 80° F. and may be from 0.020 to 0.026 inch in thickness.

The coil 20 may be formed of a high strength steel wire 25 sheathed within a sheath 26 of the same material as the tube 21. The wire 25 may be 0.058 inch in diameter and have a tensile strength of 275,000 pounds per square inch and the sheath 26 may be 0.010 inch in thickness.

The above conditions may vary widely depending upon the use to which the hose is to be put but have been found satisfactory for making hose for use with suction cleaners.

A pair of narrow small gauge electric conductors 27 and 28 of copper, aluminum or other good electrically conductive material are embedded within the wall of tube 21 at one side and follow the longitudinal contour of the tube 21 including the loop portions 24 so that as the hose is extended and the loop portions 24 straighten out and unwrap from about the turns of coil 20, the conductors 27 and 28 also straighten out and unwrap in the same manner so that the extensibility of the hose is unimpaired.

While the conductors 27 and 28 are shown as being solid, they may be made of fine stranded filaments or thin foil just wide enough to provide the necessary conductivity so as to be more easily flexed as the hose is extended and contracted.

The conductors 27 and 28 are suitably connected at one end to the switch 14 and at the other end to a suitable relay switch mounted within the cleaner 11. The relay may have its primary coil connected to the standard 110 volt circuit which is used to energize the motor of the cleaner and its secondary coil connected to the conductors 27 and 28. Actuation of the switch 14 may then be used to alter the magnetic field in the relay for closing switch contacts connected in circuit with the motor of cleaner 11.

While two conductors 27 and 28 have been shown embedded in the tube 21, a single conductor may be used and the wire 25 used as the other conductor in the secondary circuit in the above arrangement. That arrangement is described in connection with the method of making the hose by the apparatus in Fig. 5.

An electrically operated device may be attached to fitting 13 and be connected in circuit with the switch 14. In that case, one end of the conductors 27 and 28 are connected to the switch 14, the other end connected into the 110 volt circuit of the cleaner 11 whereby actuation of the switch 14 will energize and de-energize the electrically operated device which is attached to the fitting 13. The step-down relay could also be used should the electrical device operate on a voltage other than the standard 110 volt circuit.

Figure 4:
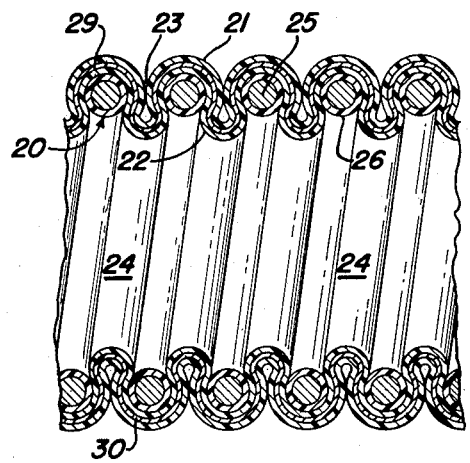
Figure 4 is a view similar to Figure 2 but showing a modification of the hose of the present invention.

The hose of Fig. 4 is similar to that of Fig. 2 and where the parts are the same they have been given the same reference numerals. In this modification one conductor 29 is embedded in one side of the hose and the other conductor 30 is embedded diametrically opposite to the first so as to more evenly distribute the conductors about the periphery of the hose. Thus the hose may be flexed just as easily about one side as the other. The conductors 29 and 30 may be otherwise spaced about the periphery of the hose if found desirable.

Figure 3:
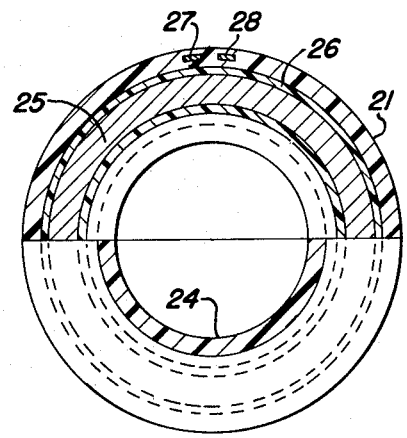
Figure 3 is a cross-sectional view taken on line 3—3 of Figure 2.
Figure 5:
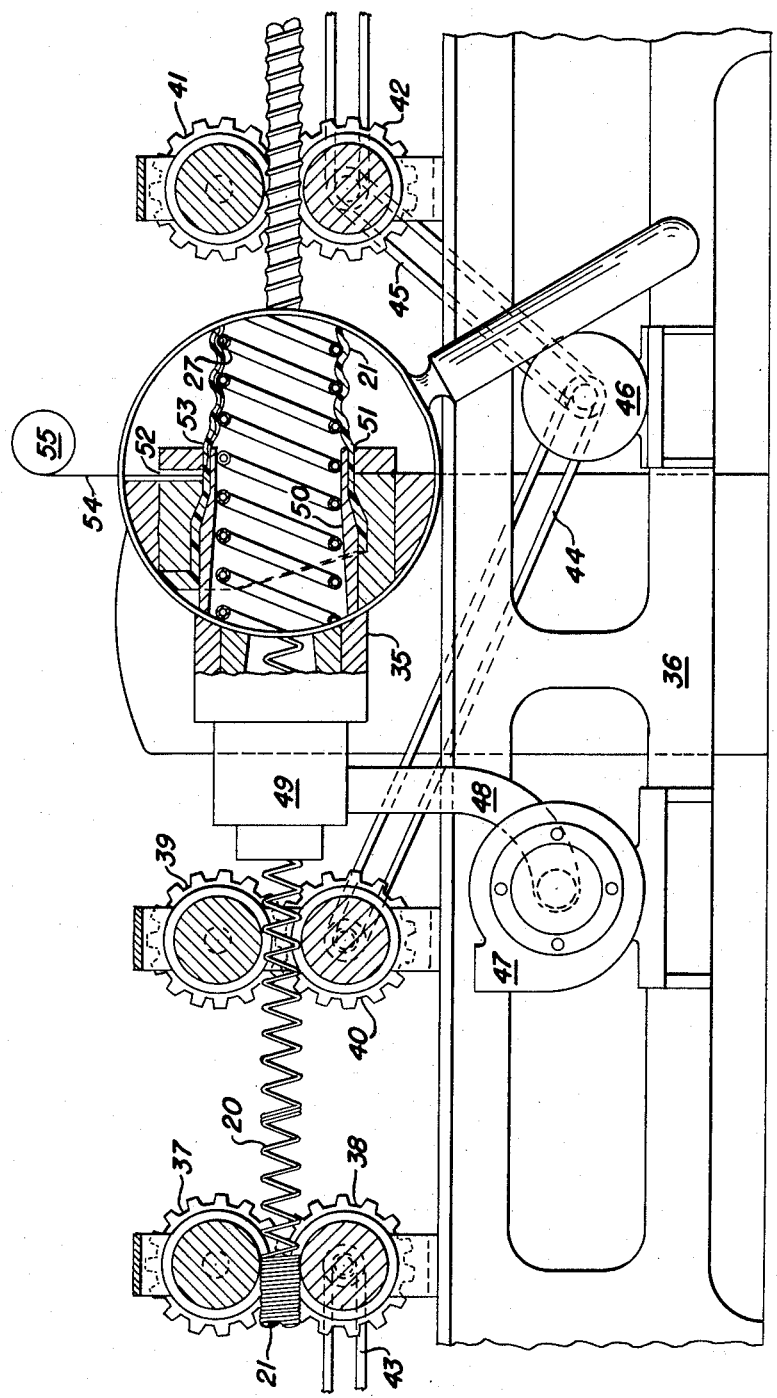
Figure 5 is a schematic representation of an apparatus by which the hose of Figures 2 and 3 may be made.

The hose of Figs. 2 and 3 may be made by the apparatus shown in Fig. 5.

The machine includes an extruding head 35 mounted on a suitable base 36, a pair of spring advancing rolls 37 and 38 geared together as shown, a pair of spring stretching rolls 39 and 40 also geared together and a second pair of spring advancing rolls 41 and 42. The rolls 37 and 38 are driven at a peripheral speed of two feet per minute by a belt 43 and the rolls 39, 40, 41 and 42 are driven at a peripheral speed of 10 feet per minute by belts 44 and 45 driven at the same speed by a motor 46. The turns of coil 20 as it approaches rolls 37, 38 are in contact with each other and the relative speed between the rolls 37, 38 and rolls 39, 40 is such that between the two sets of rolls 37, 38 and 39, 40 the coil 20 is stretched so that its turns are spaced approximately 0.408 inch apart. Other speeds or coil turn spacings may be used but the above has been found satisfactory for making suction cleaner hose.

A suction fan 47 is connected by a suction tube 48 to the rear end 49 of the extruding head 35 so as to draw a suction on the interior of the head 35 and the tube 21 as it is extruded, for a purpose which will presently appear.

The forward end of the extrusion die 35 is shown magnified to better show how the tube 21 is extruded about the turns of coil 20 and to show how a conductor may be embedded in the tube 21 as it is extruded.

The die 35 is provided at its forward end with a tubular guide 50, just slightly larger than the turns of the stretched coil 20 to guide and center the coil 20 inside an annular extrusion orifice 51 and with an opening 52 through its wall leading to the orifice 51. A pair of narrow guide pins 53 project into the orifice 51 in front of the opening 52 for a purpose which will presently appear.

In Fig. 5 a single conductor 54 is shown in the form of an aluminum tape wound about a spool 55 mounted for rotation on frame 36 in any suitable manner.

While a single conductor 54 is shown wound on spool 55, it is intended that the spool 55 may be modified to take the double conductors 27 and 28 of Figs. 2 and 3.

For making the hose of Fig. 4 a second opening would be provided in the die head immediately below the opening 52 and a second spool similar to spool 55 provided below such opening. In that case, the conductors 29 and 30 would be wound on the two spools.

Operation of Fig. 5

The free end of tape 54 is fed through the opening 52 and through the orifice 51 between the guide pins 53 and a hot plastic material fed into the orifice from the cross head as in the usual extruder, the fan 47 put into operation and the rolls 37, 38, 39, 40, 41 and 42 rotated at the proper speeds.

To the left of rolls 37 and 38 the turns of coil 20 press against each other and the coil 20 is advanced to a position between rolls 39 and 40.

As soon as that happens the turns of coil 20 are separated the proper distance apart because the rolls 39, 40 are rotating faster than the rolls 37, 38. The coil 20 advances through the extruder head 35 and between the rolls 41, 42 which are rotating at the same speed as the rolls 39, 40. The action of the rolls 41, 42 serves to hold the turns of coil 20 spaced apart the proper distance as the coil passes through the extruding die 35.

As the stretched coil 20 passes through the die 35 the hot plastic vinyl passes into the orifice 51 about the turns of coil 20 and about the tape 54. As the hot plastic passes the pins 53 it merges into a solid tube which completely envelops the tape 54.

As the plastic vinyl emerges from the orifice 51 it necks down against the coil 20 which is traveling slightly faster than the vinyl material is being extruded. That and the suction on the interior of the guide 50 causes the wall of tube 21 to move inwardly between the turns of the coil 20 as shown. Since the tape 54 is embedded in the wall of the tube 24 it will also move inwardly between the turns of the coil 20 to the same extent as the tube 21.

The soft material of the tube 21 is actually stretched inwardly somewhat by the suction and the tape 54 is drawn with it from spool 55. As the tube 21, coil 20 and tape 54 leave the die they are cooled sufficiently that the tube will take the fixed form in the position shown. If found necessary a water spray may be used for quickly cooling the tube 21.

After the coil and tube leave the rolls 41, 42, tube 21 has taken a permanent set and the coil 20 collapses lengthwise due to the fact that the coil turns are spaced apart from their original position and will move together as far as permitted by the walls of the tube 21 and form the deep loop portions 24 of slack material. Since the tape 54 is embedded in the tube wall it will also move inwardly to form deep loops of slack material.

When the coil 20 is stretched as shown in Fig. 5 and the plastic vinyl is being extruded about it, the tape 54 is drawn along with the tube 21 so that the length of the tape between each of the coil turns is the same as the length of the tube 21 between the coil turns and that length is sufficient to form the deep loops 24 of slack material when the coil 20 contracts lengthwise.

While the coil turns are shown in contact with each other before passing through rolls 37, 38, that is not absolutely essential in making an extensible hose. The coil turns may be spaced apart in front of the rolls 37, 38 and stretched further apart as the coil passes rolls 39, 40. The essential feature being that the coil turns are spaced apart from their normal static spacing when the tube 21 and tape 27 are applied.

Figure 6:
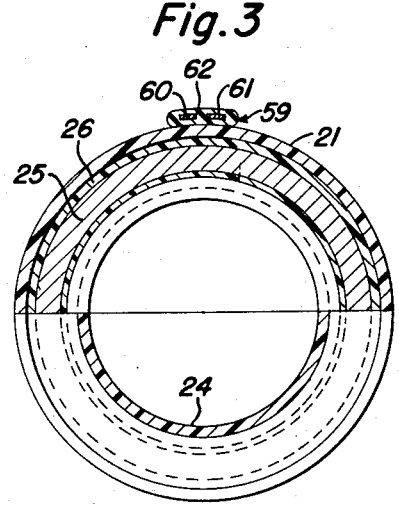
Figure 6 is a cross-sectional view of another modification of the present invention.

The hose of Fig. 6 differs from those previously described only in the arrangement of the conductors therewith. In this case the conductors are in the form of a strip 59 including a tape 62 of flexible insulating material such as elastomeric polyvinyl chloride in which is embedded a pair of thin narrow conductors 60 and 61. The strip 59 is bonded to the outer surface of the tube 21 along its entire length and follows its contour including loop portions which lie on the outside of the loop portions 24 of the tube 21.

Figure 7:
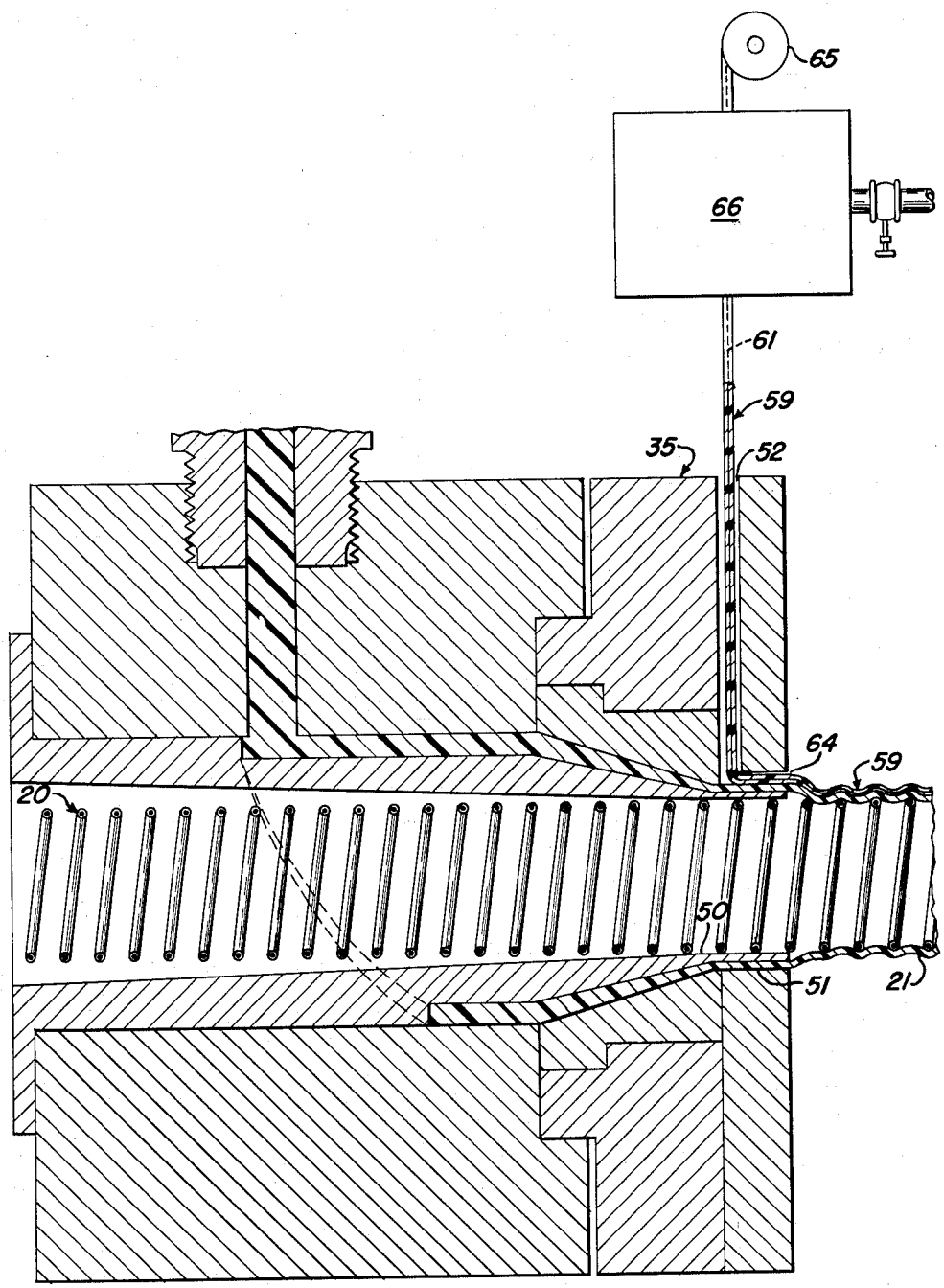
Figure 7 is a sectional view of the extruder head by which the modification of Figure 6 may be made and Figure 8 is a sectional view of another form of extruder head by which the method of the present invention may be practiced.

The extruding die of Fig. 7 is similar to that of Fig. 5 and where the parts are the same they have been given the same reference numerals.

In the apparatus of Fig. 7, the opening 52 in die 35 communicates with the groove 64 outside of orifice 51 through which the strip 59 is threaded. A spool 65 is rotatably mounted on the frame of the extruding machine for supporting a long length of the strip 59. Between the spool 65 and opening 52 is a heater 66 which may take any suitable form. As shown, the heater 66 is of the steam heated type but may be of any suitable type such as an electric heater.

In addition to or as a substitute for the heater 66 a solvent dispenser may be provided between the heater 66 and the opening 52. As shown, the groove 64 is of such a depth that the strip 59 lies just on top of the tube 21 as the latter is extruded from the orifice 51.

Operation of Fig. 7

The coil 20 is advanced and the coil turns separated by the apparatus shown in Fig. 5. As the plastic vinyl is extruded about the coil 20 the strip 59 is advanced along with the tube 21. The strip 59 is pulled from the spool 65 and passes through the heater 66 where the sheath 62 is softened. The strip 59 then passes through opening 52 and groove 64 so as to lie on top of the tube 21 and become adhered to the outer surface thereof. The suction on the interior of the tube 21 and guide 50 will stretch the material of the tube wall to form the valleys as shown. Since the strip 59 is adhered to the tube wall it will also be drawn inwardly to form valleys in the strip of the same length as the valleys in the tube 21. This comes about by reason of the fact that the material exuding from the orifice 51 is soft and the strip 59 will be drawn through the soft material to provide the necessary length of strip to form the valleys.

After the coil turns are released the valleys in the tube 21 will move inward to form the deep loops 24 in the tube with the strip adhered to the outer surface of the tube 21 within those loops.

Figure 8:
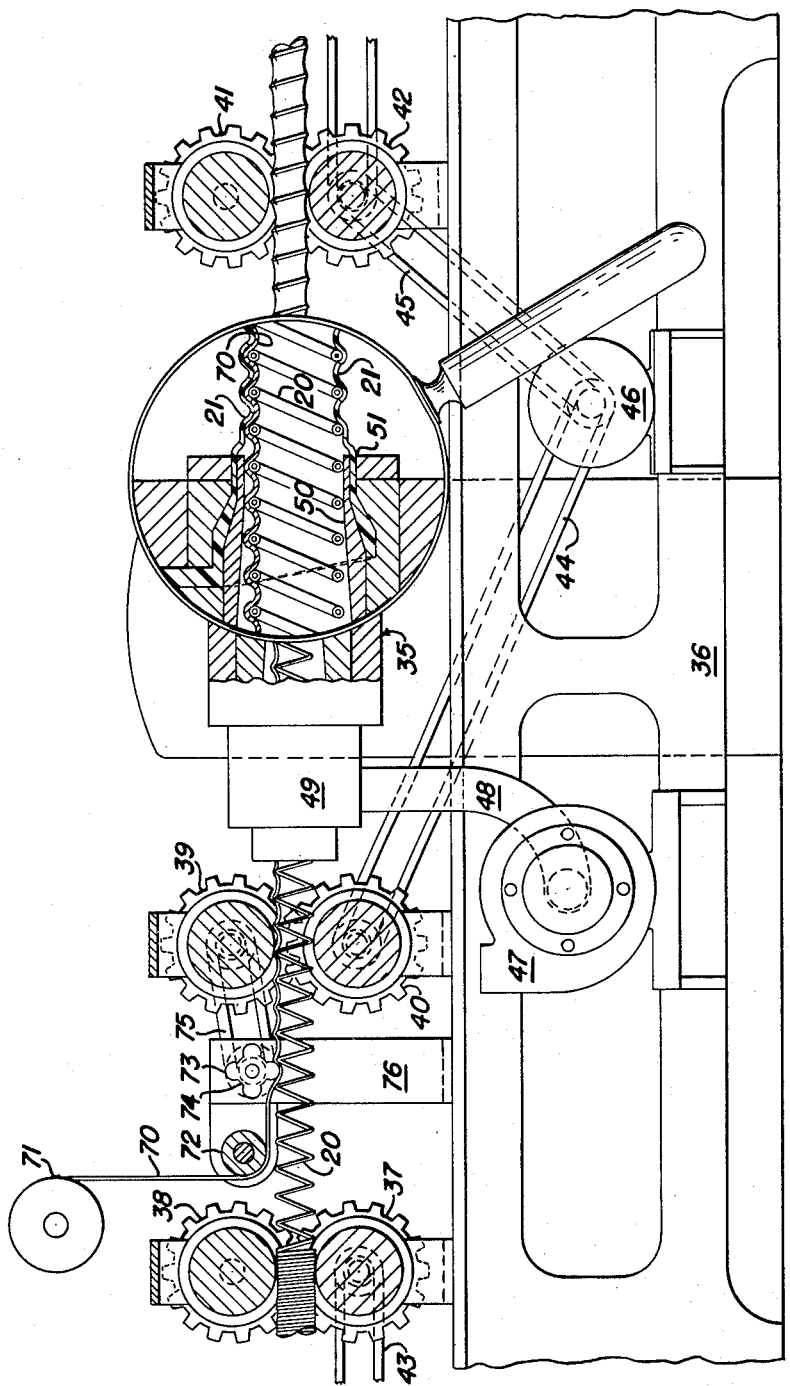

The apparatus of Fig. 8 is similar to that of Fig. 5 and where the parts are the same they have been given the same reference numerals.

In this case a thin narrow foil of conductive material is positioned between the coil turns and the tube 21 by the apparatus shown.

The hose per se made according to this modification forms no part of the present invention but is disclosed and claimed in a copending application for United States Letters Patent by George F. Carabet, Serial Number 629,874, filed December 21, 1956.

A length of the strip 70 is wound on spool 71 rotatably supported on frame 36 in any suitable manner. From the spool 71 the strip passes downwardly over a guide roller 72 and forwardly over the tips of the coil turns. As the coil 20 is being advanced in its stretched condition, the strip 70 is pressed inwardly between the coil turns by the lobes 73 of a roller 74 driven from roll 40 by means of a belt 75. The roller 74 and guide 72 are supported from frame 36 by a bracket 76.

Operation of Fig. 8

The coil advancing and stretching rolls are rotated until the coil turns reach the rolls 41, 42 to hold the coil turns in their stretched condition and then stopped. The strip 70 is then threaded between the roll 74 and coil turns and through the die 35 with the strip lying on top of the coil turns.

The entire machine is then started into operation and it operates in the same manner as described in connection with Fig. 5, except that the lobes 73 on roll 74 presses strip 70 downwardly between the coil turns so that the length of the strip 70 between adjacent coil turns is the same as the length of tubing 21 between adjacent coil turns in front of the orifice 51. As the tube 21 is extruded over the coil 20, the strip 70 will be pulled from the spool 71 and be advanced along with coil 20. When the strip material on one spool becomes depleted the free end of the strip of another spool of material may be connected to the end of the advancing strip 70 without stopping the machine. If desired, a suitable brake may be provided for the spool 71 to maintain the strip 70 under the proper tension.

From the foregoing it can be seen that the present invention provides an extensible hose having loops of slack material which are adapted to unfold when the hose is extended, in which a conductor or conductors is so associated with the tube wall in such a way as to unfold to the same extent as the tube wall when the hose is extended.

While I have shown but a number of modifications of my invention it is to be understood that those modifications are to be taken as illustrative only and not in a limiting sense. I do not wish to be limited to the specific structure and method shown and described but wish to include all equivalent variations thereof except as limited by the scope of the claims.

I claim:

1. The method of making a flexible extensible and electrically conductive hose of the type having a cylindrical spirally wound wire coil and a thin walled tube of an elastomeric thermoplastic material embracing the turns of said coil in which said tube has alternate inwardly and outwardly facing spiral folds with said inwardly facing fold embracing the turns of said coil and with said outwardly facing fold lying between the turns of said coil in the form of loop portions and a thin strip of conductive material outside of the turns of said coil and following the contour of said folds and loop portions comprising, axially spacing the turns of said coil, applying said strip over the spaced turns of said coil so as to span the same, depressing said strip inwardly between the turns of said coil to form loop portions in said strip between the turns of said coil, applying said elastomeric thermoplastic tube over said coil and strip, causing the walls of said tube to move inwardly between the turns of said coil in the form of loops in contact with the loops of said strip to form a corrugated carcass and treating the carcass to set the material of said tube in its corrugated condition.

2. The method according to claim 1 in which said coil is prestressed so that its turns will move into substantial contact with each other when free to do so, said spacing step comprises axially extending said coil to space its turns axially of each other and said strip and tube are applied to said coil while it is axially extended whereby said strip and the walls of said tube will move further inwardly between the turns of said coil when the latter is released to form deep loops of slack material which are free to unfold when the hose is extended axially.

3. The method according to claim 2 in which at least the surface of said coil is of insulating material to provide insulation for said strip.

4. The method according to claim 3 in which said coil is formed of a high strength metallic wire sheathed within a covering of an elastomeric thermoplastic material.

5. The method according to claim 1 in which said coil is formed of a high strength metallic wire sheathed within a covering of an elastomeric thermoplastic material.

6. The method of making a flexible and extensible hose of the type having a cylindrical spirally wound wire coil prestressed so that its turns tend to move toward each other after being extended and released and a thin walled tube of an elastomeric thermoplastic material embracing the turns of said coil in which said tube when the hose is in its normal contracted condition has alternate inwardly and outwardly facing spiral folds with said inwardly facing fold embracing the turns of said coil and with said outwardly facing fold lying between the turns of said coil in the form of loop portions inwardly of the turns of said coil and at least one thin strip of conductive material outside of the turns of said coil and following the longitudinal contour of said folds and loop portions whereby said loop portions and strip are free to unfold when the hose is extended comprising, stretching said coil to an extended position beyond its normal static contracted condition, simultaneously advancing said stretched coil and said strip of conductive material through an extruder and extruding said tube about said stretched spring and strip while maintaining a reduced pressure on the interior of said extruder and tube whereby said tube and strip are drawn inwardly between the turns of said coil and releasing the turns of said coil for movement toward each other to form said spiral folds and loop portions.

7. The method according to claim 6 in which said strip is positioned on the interior of said tube during the extruding step so as to lie between the turns of said coil and said tube.

8. The method according to claim 6 in which said strip is positioned so as to be embedded in the wall of said tube during the extruding step.

9. The method according to claim 6 in which said strip is encased in a thermoplastic sheath and is positioned to contact the outside of said tube during the extruding step so as to become bonded thereto as the tube is extruded.

10. The method according to claim 9 in which the sheath of said strip is preheated prior to being advanced through said extruder.

References Cited in the file of this patent

UNITED STATES PATENTS

| | | |
|---|---|---|
| 2,396,059 | Roberts | Mar. 5, 1946 |
| 2,550,555 | Hallam et al. | Apr. 24, 1951 |
| 2,602,608 | Darling | July 8, 1952 |
| 2,641,302 | Martin et al. | June 9, 1953 |
| 2,766,806 | Rothermel et al. | Oct. 16, 1956 |